(12) United States Patent
Saito et al.

(10) Patent No.: US 6,690,376 B1
(45) Date of Patent: Feb. 10, 2004

(54) STORAGE MEDIUM FOR STORING ANIMATION DATA, IMAGE PROCESSING METHOD USING SAME, AND STORAGE MEDIUM STORING IMAGE PROCESSING PROGRAMS

(75) Inventors: Tomoaki Saito, Tokyo (JP); Kazuyoshi Hara, Tokyo (JP); Hideki Kudo, Tokyo (JP); Yutaka Aoki, Tokyo (JP); Takashi Ando, Tokyo (JP); Atsushi Seimiya, Tokyo (JP); Kenei Unoki, Tokyo (JP)

(73) Assignee: Sega Enterprises, Ltd. (JP)

( * ) Notice: Subject to any disclaimer, the term of this patent is extended or adjusted under 35 U.S.C. 154(b) by 269 days.

(21) Appl. No.: 09/661,033

(22) Filed: Sep. 13, 2000

(30) Foreign Application Priority Data

Sep. 29, 1999 (JP) .......................................... 11-277049

(51) Int. Cl.[7] .............................................. G06T 17/00
(52) U.S. Cl. ....................................................... 345/473
(58) Field of Search ................................. 345/473–475, 345/950, 952, 422, 582

(56) References Cited

U.S. PATENT DOCUMENTS

| | | | | |
|---|---|---|---|---|
| 5,590,249 | A | * 12/1996 | Hanaoka | 345/422 |
| 5,706,417 | A | * 1/1998 | Adelson | 345/474 |
| 2002/0008703 | A1 | * 1/2002 | Merrill et al. | 345/473 |

FOREIGN PATENT DOCUMENTS

JP 10-232951 2/1998

OTHER PUBLICATIONS

Lengyel et al ("Rendering with Coherent Layers": Aug. 1997, ACM.*
Snyder et al (Visibility Sorting and Compositing without splitting for Image layer decompositions: Jul. 1998—ACM).*

* cited by examiner

Primary Examiner—Almis R. Jankus
(74) Attorney, Agent, or Firm—Dickstein Shapiro Morin & Oshinsky LLP

(57) ABSTRACT

A storage medium for a game relating to the present invention contains: (1) a game program for calling up drawing functions for prescribed scenes in accordance with the progress of the game; (2) animation data including sprite data forming two-dimensional still images, and motion data capable of generating animations by causing the sprites to change with each frame; and (3) a drawing program for generating rendering data (drawing commands) positions, colours, texture co-ordinates, and the like, for each sprite in a frame (display screen), according to the animation data specified by the drawing function. In general terms, animation data is data capable of generating moving images (animations) of characters as intended by a designer, and this animation data can be developed separately from the game program. Moreover, a drawing program is a generic drawing library capable of interpreting the animation data and generating rendering data, including position data for each sprite in a frame, for each respective frame. A game program simply calls up a drawing function (library function) which specifies animation data so as to be capable of causing the drawing library to interpret the specified animation data and generate rendering data accordingly.

15 Claims, 18 Drawing Sheets

FIG. 2A
Conventional
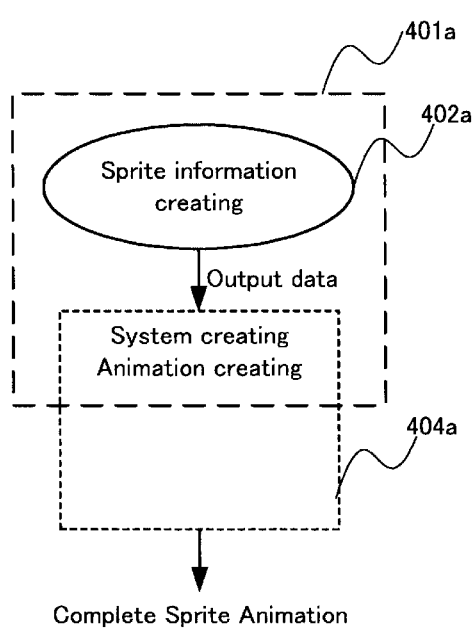
FIG. 2B
Present Invention
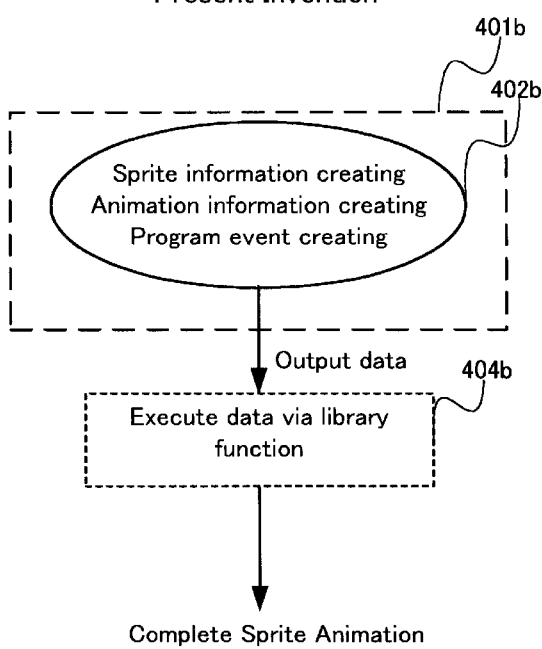
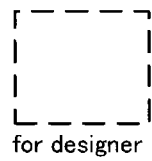
for designer
for programer Cell Sprite Data Group Cell Stream Data

FIG. 12

Cell Stream Data

```
CSTREAM_START                  ~113x

CELLSTREAMDATA csdata_body[]
START
      CCnk_TS(0, 27), /* timestamp 0 */
      CCnk_CE(0, 16, FCB_IAO|FCB_MO1|FCB_PR2|FCB_CE3|FCB_VC4|FCB_UV5),
117   Bk_IAO(10, FCS_SA|FCD_ISA|FCA_VC|FCA_AL),
      Bk_MO1PR2(0x41200000, 0x41200000,  /* coxy 10.0F, 10.0F */
118a1           0x42800000, 0x42800000,  /* csxy 64, 64 */
                90.0F, 1),
      Bk_CE3(0x3f000000, 0x3f000000),  /* 0.5F, 0.5F */
      Bk_VC4_0(255, 255, 90, 100),
      Bk_VC4_1(255, 200, 130, 100),
      Bk_VC4_2(255, 150, 190, 100),
      Bk_VC4_3(255, 100, 200, 100),
      Bk_UV5(0x3e99999a, 0x3eccccccd,  /* csuv0 0.3F, 0.4F */
             0x3f000000, 0x3f19999a),  /* csuv2 0.5F, 0.6F */
118a2 CCnk_CE(10, 6, FCB_IAO|FCB_MO1),
      Bk_IAO(11, FCS_SA|FCD_ISA|FCA_VC|FCA_AL),
      Bk_MO1(0x41200000, 0x41200000,  /* coxy 10.0F, 10.0F */
             0x42800000, 0x42800000,   /* csxy 64, 64 */
             90.0F),
118a3 CCnk_CE(1, 2, FCB_IAO|FCB_PR2),
      Bk_IAO(12, FCS_SA|FCD_ISA|FCA_VC|FCA_AL),
      Bk_PR2(2),
      CCnk_TS(1, 4), /* timestamp 1 */
      CCnk_TD(99, 10),
117   CCnk_AT(100, FCS_SA|FCD_ISA|FCA_VC|FCA_AL),
      CCnk_CZ(100, 45.0f),
      CCnk_CP(101, 10),
      CCnk_TS(2, 4), /* timestamp 2 */
      CBCnk_AD(16, 1), /* laddr=16, lsize-1 */
117   0x000100ff,
      CBCnk_ED(2, 0, 7),
      0x000200ff, 0x0300ffff, 0x0ff0ff00, 0xffffffff,
307   0x0f0f0f0f, 0xeeeeeeee, 0x1e1e1e1e,
      CCnk_UE(3, 0), /* user event longsize=3, eventId-0 */
      0x000000ff, 0xffffffff, 0xf0f0f0f0f,
305   CCnk_TE(100), /* timestamp 3 */
END CELLSTREAM cstream_body
START
CStreamData    csdata_body,
CSCurrent      csdata_body,    ~113BB
CSTimeOffset   0,
CSTimeMax      100,
END CSTREAM_END    ~113y
```

118a

118b

118c

113A

113B

113

Cell Sprite Motion Data

Cell Sprite Motion Data

FIG. 15

Program Event

Event ID 0(event ID : 0)
1. Words
2. Loudness
3. Pitch

Event ID 1(event ID : 1)
1. a
2. b
3. c

Event ID 2(event ID : 2)
1. d
2. e
3. f

FIG. 16
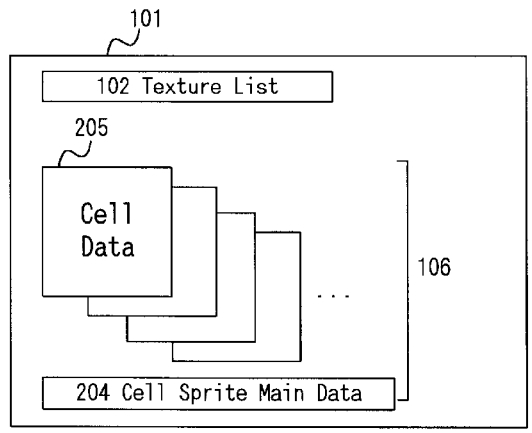
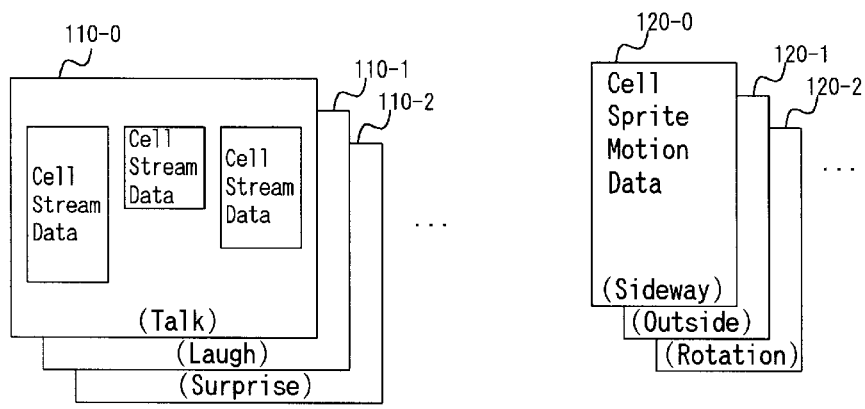
Library Function:LB(Cell Stream Number, Cell Sprite Motion Data Number)
LB(101,110-0)
LB(101,110-1,120-0)
LB(101,110-2,120-2)

STORAGE MEDIUM FOR STORING ANIMATION DATA, IMAGE PROCESSING METHOD USING SAME, AND STORAGE MEDIUM STORING IMAGE PROCESSING PROGRAMS

BACKGROUND OF THE INVENTION

1. Field of the Invention

The present invention relates to animation data which is processed as images in real time, and to an image processing method and image processing program using same.

2. Description of the Related Art

In a home video game device, or the like, moving images of characters or objects in a game are created in real time, in synchronism with the development of the game. In image processing in a game device of this kind, it is necessary for the positions of objects in the game to be moved in response to operational input signals from an operator, and for images corresponding to these moved positions to be drawn into a frame memory, which is an image memory, within a short time period, namely, the frame time period.

2D animation technology, which generates animated images by positioning two-dimensional images (sprites) within a frame and causing these images to change with each frame, is capable of generating predetermined animated images by means of relatively simple image processing, and it is therefore used widely in home video game devices, portable game devices, and the like. 2D animation is also known as 'sprite animation'. In this specification, both terms '2D animation' and 'sprite animation' are used interchangeably, and have the same meaning.

FIG. 1 is a diagram illustrating a conventional 2D animation method. FIG. 1A is a frame stream showing an example of consecutive frames F0, F1, F2, . . . in 2D animation. In each frame, an image consisting of a plurality of sprites is generated, and this image changes gradually with each frame in order to represent a particular movement. FIG. 1B shows examples of individual sprites. The object in frame F0 is constituted by a plurality of sprites. For example, sprite SP0 is the head portion of the object, sprite SP1 is an eye, sprite SP2 is a hand, and so on. Each sprite has a plurality of images, including a forward image, lateral images, and the like, in terms of the head region. Images can be generated by appropriately selecting the pre-designed sprites and attaching them together in the frame.

In conventional 2D animation using sprites, a sprite consisting of a two-dimensional image is used as the basic element of the image, and a prescribed image is produced by selecting sprites and placing them in prescribed positions within the frame according to a game program.

On the other hand, video games are now being developed by designers, who design images which incorporate movement of characters within the game, and programmers who design game programs which correspond to game stories. With the massive development of video games in recent years, it has become essential to divide the workload of designers and programmers.

A designer creates sprites SP forming components which make up objects, such as characters, and the like, as illustrated in FIG. 1B, and supplies these sprites to the programmer in a prescribed data format. The programmer then designs a program which selects the aforementioned sprites appropriately, and positions these sprites in a frame (display screen) in order to reproduce movements of game objects specified by the programmer according to a game program which controls the game story. Consequently, the ultimate sprite animation can only be verified finally when the game program designed by the programmer is executed.

In video games, in addition to displaying animated images, it is also necessary to generate sounds, and the like, in synchronism with these animated images. Therefore, in a conventional game program, it has been possible to provide a game output containing synchronized images and sound, by generating animated images using sprites and generating sound which is synchronized to these images.

However, the essential objective of a designer is not to design individual sprites, but to design animated images based on objects (or characters) made up of a plurality of sprites. Moreover, the designer also designs the whole game output, including decisions on the timings in the animated images at which sound or music should be inserted. Consequently, in a conventional game development environment, in which a designer designs sprites images only, and conveys the movements of objects made up of a plurality of these sprites to a programmer, by word of mouth or in writing, whereupon the programmer reproduces these movements in a game program, which are then checked by the designer, and require subsequent revisions to be made, it has been very difficult for designers to achieve sprite animation which fully reflects their design aims.

Furthermore, the development of geometry processor functions for selecting sprites and positioning them within in a frame, in a game program, has led to further complexity in game programs which controls complicated game stories.

Moreover, in image processing using sprites in a game program, for example, in a scene where a character blinks when facing in a forward direction and a scene where a character blinks when facing to the side, although the same eye operation, namely, blinking, is involved, it is necessary to have a program which generates respective animations based on the eye sprites for each of the scenes, and hence the game program expands enormously in size.

SUMMARY OF THE INVENTION

Therefore, it is an object of the present invention to provide an image processing method and image processing program for animation, and animation data for realizing same, whereby it is possible to design animated images which conform more closely to the intentions of the designer, in an animation (sprite animation) process.

It is a further object of the present invention to provide animation data designed principally by a designer, in an animation process, which is able to represent both animated images of a plurality of sprites and animated images of an object constituted by a combination of these sprites, and to provide an image processing method and image processing program using this data.

It is a further object of the present invention to provide animation data capable of supplying animation of respective sprites and animation of objects consisting of a plurality of sprites, in an animation process, simply by specifying data relating to a desired scene in a game program which controls a complicated game story, and to provide an image processing method and image processing program using this data.

It is a further object of the present invention to provide animation data having a relatively small data volume, which is capable of realizing animation relating to a plurality of scenes, in an animation process, and to provide an image processing method and image processing program using this data.

It is a further object of the present invention to provide animation data which enables prescribed events to be synchronized with prescribed timings during animation, and to provide an image processing method and image processing program using this data.

In order to achieve the aforementioned objects, a storage medium for a game relating to the present invention contains: (1) a game program for calling up drawing functions for prescribed scenes in accordance with the progress of the game; (2) animation data including sprite data forming two-dimensional still images, and motion data capable of generating animations by causing the sprites to change with each frame; and (3) a drawing program for generating rendering data (drawing commands) positions, colours, texture co-ordinates, and the like, for each sprite in a frame (display screen), according to the animation data specified by the drawing function.

In general terms, animation data is data capable of generating moving images (animations) of characters as intended by a designer, and this animation data can be developed separately from the game program. Moreover, a drawing program is a generic drawing library capable of interpreting the animation data and generating rendering data, including position data for each sprite in a frame, for each respective frame. A game program simply calls up a drawing function (library function) which specifies animation data so as to be capable of causing the drawing library to interpret the specified animation data and generate rendering data accordingly. Therefore, the programmer is able to design a game program which generates particular scenes, without being aware of the animated images of the characters (or objects). The programmer can cause an animation created by the designer to be displayed, simply by designating the required drawing function in the game program. Moreover, the designer is able to pursue his or her design, including animation of the characters, as he or she pleases, in a separate environment for the development of the game program.

In one aspect of the present invention, conventional sprites are called cells, and an object or character constituted by a plurality of cells is called a 'cell sprite'. Furthermore, cell sprite data is constituted by a plurality of cell data and main data relating to the whole cell sprite. This main data comprises global co-ordinates within the frame, for example, whilst the cell data comprises local co-ordinates within the cell sprite, and texture data which is to be attached to the cell. Accordingly, it is possible to generate position data and texture data, and the like, for a cell sprite in a frame (display screen), on the basis of cell sprite data. Therefore, it is possible to generate rendering data for generating still images within a single frame, by means of the relevant cell sprite data.

In a further aspect of the present invention, data for generating animated images comprises cell stream data wherein cell data is caused to change in a stream of consecutive frames, and cell sprite motion data wherein the main data for the cell sprite is caused to change in a stream of frames. The cell stream data is data for changing one cell or a plurality of cells in a prescribed manner, in accordance with the frame number, and as one method for achieving this, it is possible to incorporate data indicating which cell data changes, and in what manner, at each frame. Alternatively and more desirably, the cell stream data only contains differential data indicating required changes with respect to the cell sprite data in the preceding frame, this differential data being assigned to frames which require changes. Furthermore, it is also possible to set a plurality of cell stream data respectively and independently, and to set the start and end frames, total frame number, and the like, in an independent fashion. Consequently, by using a cell stream list which combines a plurality of cell stream data, it is possible to achieve a large number of animations, efficiently, and with a high degree of freedom. For example, by combining a cell stream list relating to blinking of the eyes with a plurality of cell stream lists wherein the head region is moved in different ways, in a prescribed frame correlation, it is possible to achieve a large number of animations, efficiently, and with a high degree of freedom.

The sprite motion data wherein the main data for the cell sprite is changed is data which causes a cell sprite constituted by a plurality of cells to change in a prescribed manner. As one method for achieving this, it is possible to incorporate data for changing the main data for each frame. Alternatively, the cell sprite motion data may contain only differential data indicating changes required with respect to the preceding frame, this differential data being assigned to the frame requiring these changes. Moreover, more desirably, the cell sprite motion data may comprise data for changing the main data for every prescribed number of frames. Since changes in a cell sprite, which comprises a group of several cells, can be determined with relatively high precision by means of linear interpolation, it is possible to generate main data for each frame, simply from the data for each prescribed number of frames.

In a further aspect of the present invention, the drawing program generates rendering data including position data for cells within a frame (display screen), for each frame, in accordance with animation data comprising cell sprite data, cell stream data and cell sprite motion data. This drawing program executes a drawing function specifying cell sprite data (or a cell stream list consisting of a plurality of cell stream data) and cell sprite motion data. This drawing function is a subroutine which is called up from the game program. The drawing program is a low level element program forming a drawing library, which supports the game program and cell sprite data group.

In order to achieve the aforementioned objects, the first aspect of the invention is a storage medium storing animation data for animations whereby moving images are generated by positioning cells having two-dimensional images within a frame, wherein the animation data comprises: cell sprite data including a plurality of cell data each of which contains, at the least, position data and texture for the cell; and motion data including cell stream data each of which contains change information for the cell data in accordance with a series of frames.

By means of a designer creating the aforementioned animation data, it is possible to design a final animation, without depending on a game program.

A desirable embodiment according to the first aspect of the present invention is a storage medium for storing animation data, wherein a cell sprite is constituted by the plurality of cells, and the cell sprite data further comprises main data contains global positional information for the cell sprite within the frame.

A further desirable embodiment is a storage medium for storing animation data according to the aforementioned embodiment, wherein the motion data also comprises cell sprite motion data containing change information for the main data in accordance with a series of frames.

In order to achieve the aforementioned objects, a second aspect of the present invention is a storage medium storing: animation data according to the first aspect of the invention;

a game program for implementing a game in response to operational inputs from an operator; and a drawing program for generating cell sprite data for the frame currently under processing by changing the cell sprite data on the basis of the motion data designated by the game program, and for generating rendering data containing position data for the cells in the frame from the aforementioned generated cell sprite data.

This storage medium stores animation data for realizing animations created by the designer, and a game program, in a separate fashion. Therefore, the designer is able to design animations independently, without relying on a game program, and the programmer is able to insert particular scenes within a game story, by using the drawing program.

In order to achieve the aforementioned objects, a third aspect of the present invention is an image processing system comprising the storage medium according to the third aspect of the invention; and rendering unit for generating image data for pixels for each frame, in accordance with the rendering data.

In order to achieve the aforementioned objects, a fourth aspect of the present invention is an image processing method for generating rendering data for each frame, by referring to the animation data according to the first aspect of the invention, comprising the steps of: generating cell sprite data for the frame currently under processing by changing cell sprite data on a basis of designated motion data; generating position data for each cell in the frame, in accordance with the cell sprite data for the frame currently under processing; and rendering to generate image data for pixels for each frame, in accordance with rendering data including the position data for each cell within the frame, and texture data for each cell.

In order to achieve the aforementioned objects, a fifth aspect of the present invention is a storage medium storing an image processing program for causing a computer to execute a procedure for generating rendering data for each frame, by referring to animation data according to the first aspect of the invention, the procedure comprising the steps of: generating cell sprite data for the frame currently under processing by changing cell sprite data on a basis of designated motion data; and generating position data for each cell in the frame, in accordance with the cell sprite data thus generated for the frame currently under processing.

BRIEF DESCRIPTION OF THE DRAWINGS

FIGS. 2A and 2B are a diagram showing a procedure up to the generation of sprite animation according to the present invention, in comparison to a conventional example;

FIG. 12 is a diagram showing a specific example of cell stream data;

FIG. 15 is a diagram showing a program event;

FIG. 16 is a diagram showing a relationship between a cell sprite data stream group and library functions;

DESCRIPTION OF THE PREFERRED EMBODIMENTS

Below, embodiments of the present invention are described with reference to the drawings. However, these embodiments do not restrict the technical scope of the present invention.

Figure 1A:
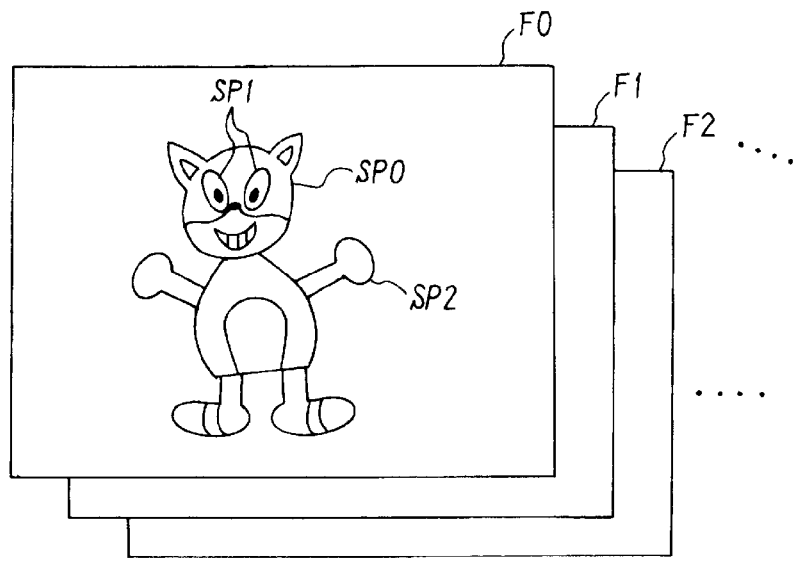
FIGS. 1A and 1B are a diagram illustrating a conventional 2D animation.
Figure 1B:
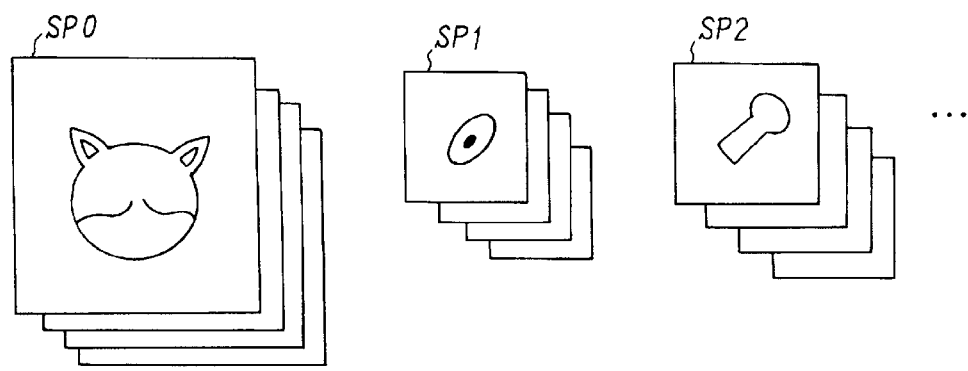

FIG. 2 is a diagram illustrating the procedure up to generation of sprite animation data, in comparison with a conventional example. As illustrated in FIG. 2A, in a conventional procedure, work step 401a performed by a designer comprises a sprite information creating step 402a and a portion of the work step 404a performed by a programmer. Work step 404a performed by the programmer includes co-operative work with the designer. As illustrated in FIG. 1, the designer designs sprites and generates sprite data, and after detailed collaboration with the programmer, he or she awaits completion of a game program which realizes animations using the sprites. The designer then evaluates the animations generated by executing the game program, and if necessary, he or she requests further collaboration with the programmer, in order that a prescribed animation can be realized by the program.

In the work procedure according to the present invention, on the other hand, as illustrated in FIG. 2B, the tasks of creating sprite information (data) for characters and objects, creating animation information (data) using these sprites, and creating information relating to program events, and the like, are included in work step 401b performed by the designer. Therefore, in addition to designing still images of characters and objects, the designer is also able to design animated images, independently of the programmer. The game program 404b created by the programmer simply incorporates a program corresponding to the game story, and in order to generate animated sprite images, it is sufficient simply to insert a drawing library function into the program. The library function specifies sprite information and animation information, and is executed by a middle-ware drawing program (not illustrated).

Figure 3:
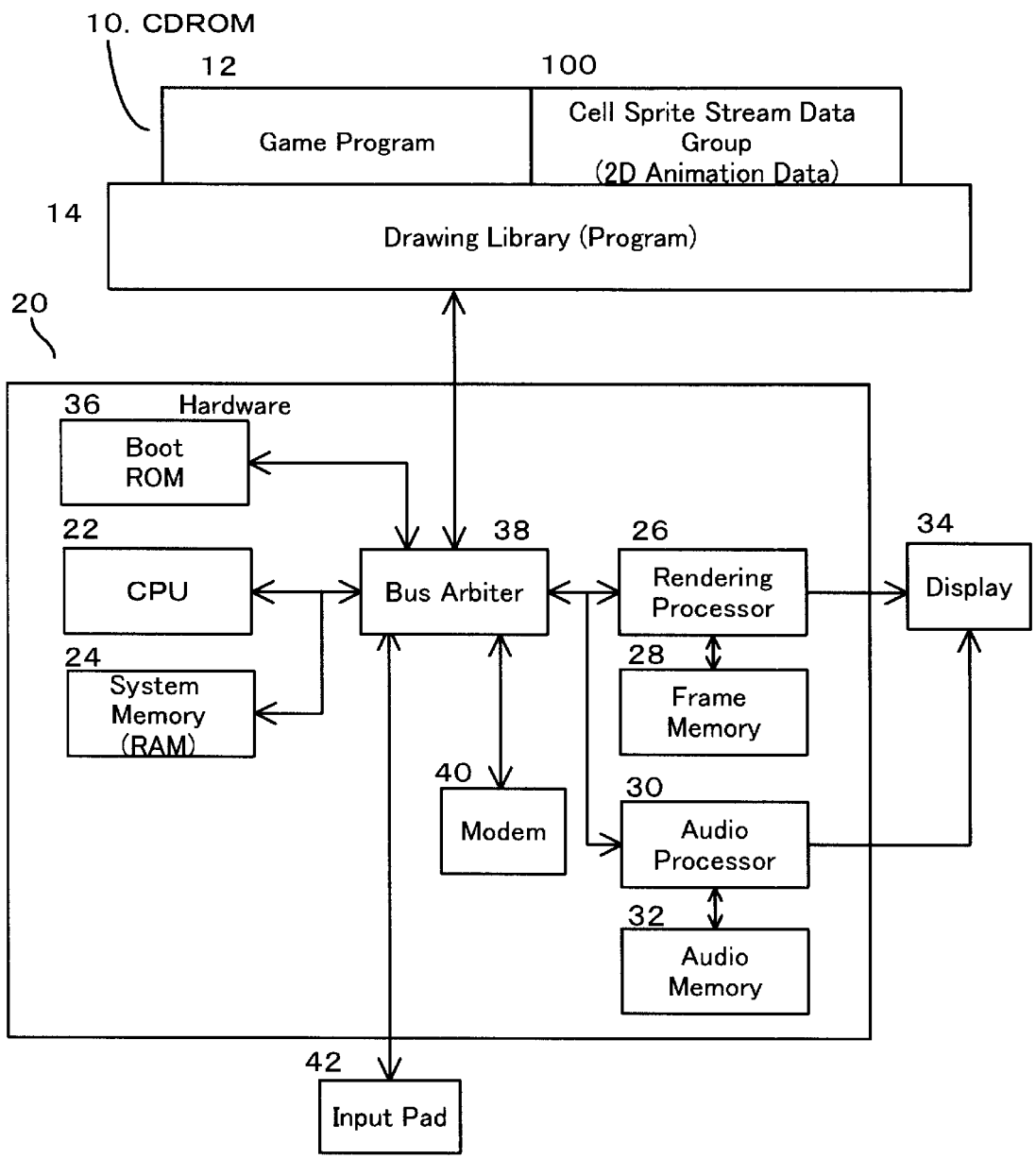
FIG. 3 is a diagram showing the internal composition of a storage medium for a game according to an embodiment of the present invention, and the hardware relationships of same.

FIG. 3 is a system composition diagram showing the composition and hardware relationship in a game storage medium according to the present embodiment. As illustrated in FIG. 3, the game storage medium 10, which is constituted by a CD-ROM, or the like, stores a game program 12 which develops the game in accordance with operational inputs from the operator, and generates a library function for drawing operations, 2D animation data containing animation information for cell sprites constituting characters and objects, and a drawing library (type of program) 14 for executing the library function generated by the game program 12, and the like. In the present embodiment, the 2D animation data 100 is known as a cell sprite stream data group.

When the storage medium 10 storing the aforementioned game program 12, the cell sprite stream data group (2D animation data) 100 and the drawing library 14 is installed in the hardware 20, which is a video game device, the aforementioned game program 12 is executed by means of an operating system (not illustrated), and the drawing library 14 generates rendering data (drawing commands) for each frame, by referring to the cell sprite stream data group (2D animation data) 100, in accordance with the library function called up by the game program. This rendering data is rendered by a rendering processor 26 in the hardware 20, and image data for each pixel is generated for each frame and stored in the frame memory 28.

In the hardware 20 illustrated in FIG. 3, a CPU 22 for performing calculational processing is connected via a bus to a system memory (RAM) 24 which temporarily reads in a game program 12 and a cell sprite stream data group 100, or the like, from the game storage medium 10 and is used as a buffer memory for calculational processing. The rendering processor 26 for performing rendering on the basis of rendering data (drawing commands) generated by the drawing library, the frame memory 28 storing image data drawn by the rendering processor 26, an audio processor 30 for generating sound data in response to program events, and an audio memory 32 for storing the generated sound data are connected by means of a bus arbiter 38. Image data stored in the frame memory 28 and sound data stored in the audio memory 32 are displayed and output via display means 34, such as a video monitor, or the like. Moreover, the bus arbiter 38 in the game device 20 also functions as an interface, and it is connected to a game input control pad 42 forming input means, and to an external communications circuit by means of a modem 40. Furthermore, the bus arbiter 38 is also connected to a boot ROM 36 and a boot operation is performed when the power is switched on, by executing the data in this boot ROM. The game device 20 is also connected via the bus arbiter 38 to a game storage medium 10, for example, a CD-ROM or game cartridge, which is used as an external memory device.

Next, a description is given of the cell sprite stream data group 100, which forms the 2D animation data used in the present embodiment.

Figure 4:
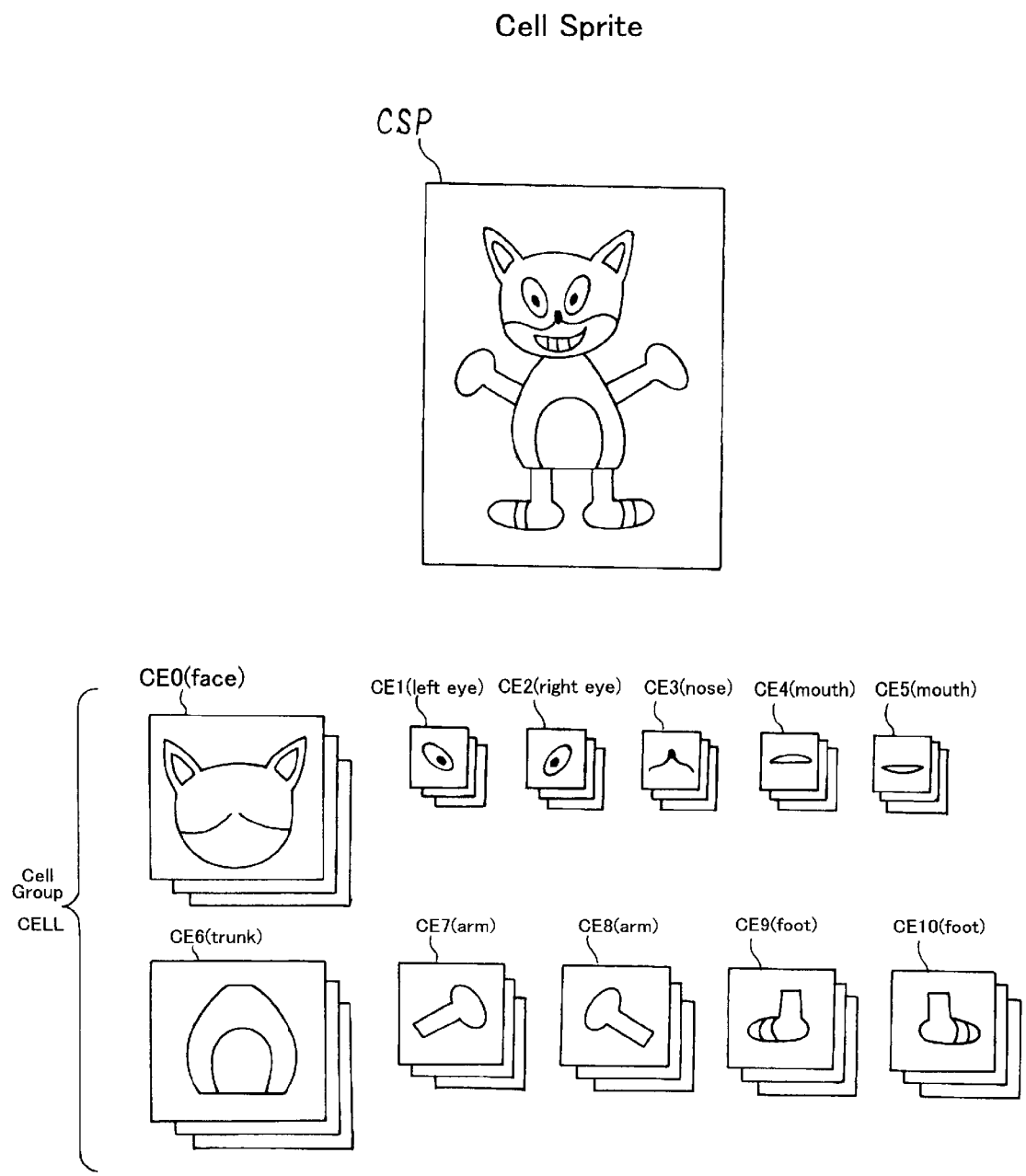
FIG. 4 is a diagram showing the relationship between a cell and a cell sprite in an embodiment of the invention.

FIG. 4 is a diagram showing the relationship between cells and a cell sprite in the present embodiment. In this embodiment, a conventional sprite forming part of a character or object is called a 'cell', whilst a main sprite constituted by a group of multiple cells, CELL, is newly defined as a cell sprite CSP. As illustrated in FIG. 4, if a certain character is defined as a cell sprite CSP, then the group of components making up this cell sprite corresponds to the cell group CELL. As FIG. 4 shows, this cell group contains cell CL0 corresponding to the face of the character, cells CE1, CE2 corresponding respectively to the left eye and right eye, cell CE3 corresponding to the nose, cells CE4 and CE5 corresponding to the upper part of the mouth and lower part of the mouth, cell CE6 corresponding to the trunk, and cells CE7–CE10 corresponding to the right arm, left arm, right foot and left foot. Each of the cells comprises forward-facing cells, rightward-facing cells and leftward-facing cells, and the like, in case of the face cell CL0.

Figure 5:
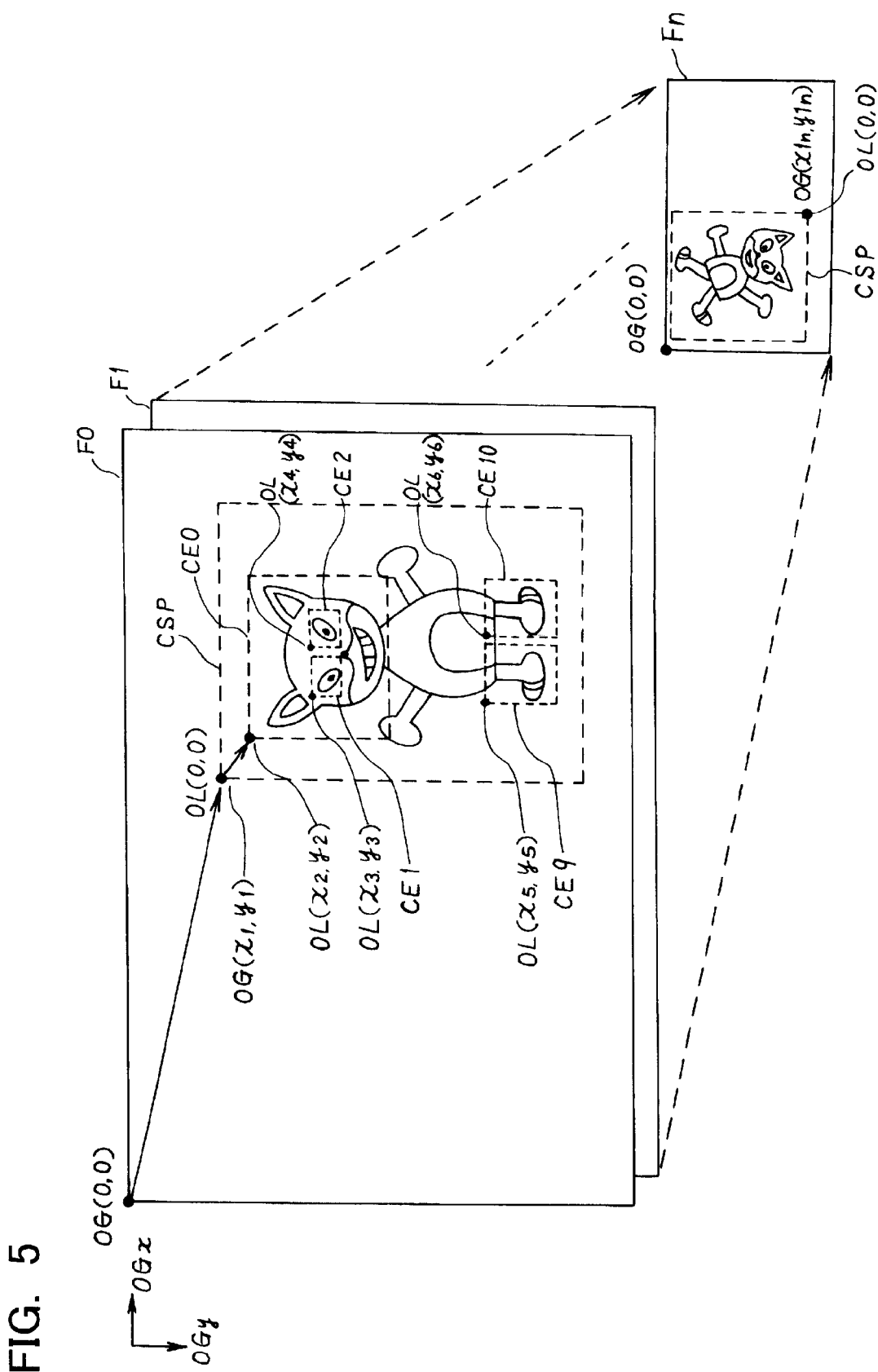
FIG. 5 is a diagram illustrating an example of an animation using a cell sprite.

FIG. 5 is a diagram showing an example of animation using a cell sprite. FIG. 5 shows consecutive frames F0, F1–Fn, a still image where the character is standing on the right edge of the frame region (display region) being depicted in frame F0, and a still image where the character is depicted upside-down on the left edge of the frame region being depicted in frame Fn. The example in FIG. 5 shows a series of consecutive frames for the purpose of generating an animation wherein the character changes from a state where it is standing normally on the right-hand edge of the display screen, to a state where it has rotated and is finally upside-down at the left-hand edge of the display screen.

The cell sprite CSP constituting the character is made up of a group of plural cells. In the example in FIG. 5, the cell sprite CSP is generated by positioning a cell CE0 corresponding to the face, cells CE1, CE2 corresponding to the eyes, and cells CE9, CE10 corresponding to the feet, and the like, at co-ordinates data $0L(x2,y2)$–$0L(x6,y6)$ in the local co-ordinates system $0L$ within the cell sprite. $0L(0,0)$ is the point of origin of the local co-ordinates within the cell sprite. Moreover, the cell sprite CSP itself is located at a global co-ordinates position $0G(x1,y1)$ in a global co-ordinates system $0G$ within the frame.

It is recognized that in the final frame Fn, the global co-ordinates of the cell sprite are different, namely, $0G(x1n, y1n)$, compared to the first frame F0. Positional information relating respectively to the cells within the cell sprite and the cell sprite within the frame also contains angle data, scale (size) data, and the like, in addition to the aforementioned co-ordinates data. This is described in more detail below.

Therefore, the positions in the global co-ordinates system of the cells CE constituting the cell sprite CSP can be determined by calculation from the global co-ordinates $0G(x1,y1)$ of the cell sprite and the local co-ordinates $0L$ of each cell.

A cell sprite is not limited to a character as illustrated in FIG. 5, and it may also be a cell group constituted by a plurality of cells depicting an explosion scene, for example.

It is possible to generate a prescribed animation by changing the cells constituting a cell sprite and changing the positions of the cells. Moreover, it is also possible to cause the cell sprite itself to move uniformly within the frame, by changing the position of the cell sprite within the frame.

Figure 6:
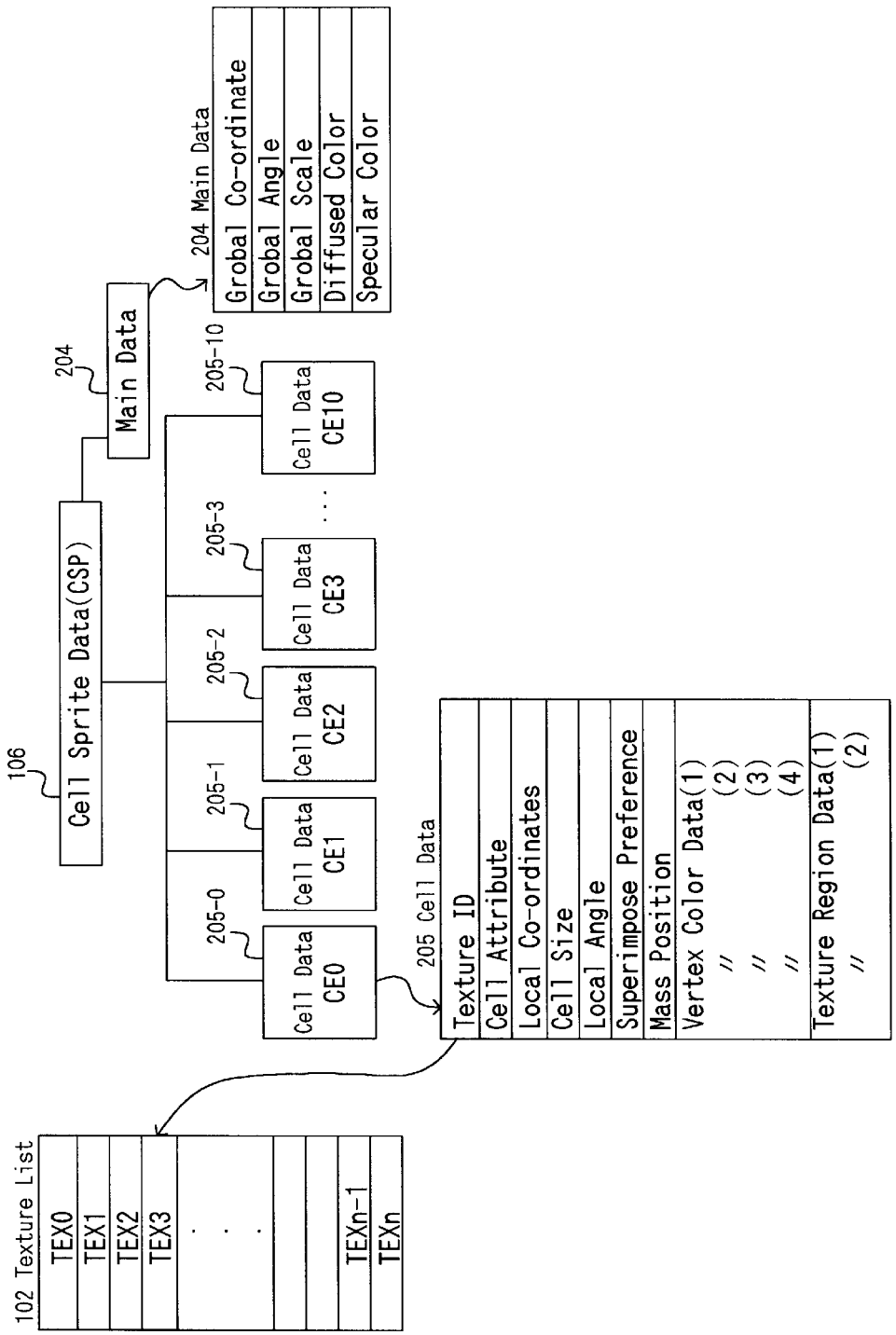
FIG. 6 is a diagram showing the structure of cell sprite data.

FIG. 6 is a diagram illustrating the structure of cell sprite data. As shown in FIG. 5, a cell sprite CSP is constituted by a plurality of cells CE1–CE10. Therefore, the cell sprite data 106 is constituted by cell data 205-1–205-10 corresponding to a plurality of cells CE0–CE10, main data 204 for the cell sprite, and a texture list 102 linked to each respective cell data.

As shown in the example in FIG. 6, the cell data 205 comprises: a texture ID indicating the picture texture attached to the cell; a cell attribute (flag data) specifying use/non-use of cell transparency, etc.; local co-ordinates within the cell sprite; a cell size indicating the scale of the cell; a local angle indicating the inclination of the cell within the cell sprite; a superimpose preference factor indicating the position of the cell in superimposition with other cells within a cell sprite; a mass position indicating the centre of gravity of the cell; colour data at the four vertices of the cell (transparency α, RGB tone value); region data for texture to be attached to the cell (top left and bottom right); and the like. Furthermore, the texture list 102 contains a texture file name, or a texture buffer address, corresponding to each texture ID, or the like.

It is possible to identify at what position, at what angle and at what size, to locate a cell within a cell sprite, from the aforementioned local co-ordinates, local angle, centre of gravity and cell size. Moreover, from the vertex colour data, it is possible to specify the colour within the cell. The picture (pattern) to be attached to the cell can be identified from the texture ID and texture region data.

A cell sprite consisting of a plurality of cells has main data 204 which comprises global co-ordinates, a global angle, and a global scale, for the cell sprite. From this global position data within the frame, it is possible to identify at what position, at what angle, and at what size, the cell sprite should be located within the frame. The main data 204 also contains diffused colour data and specular colour data for the cell sprite. The overall colour of the cell sprite is determined from this data along with the colour data contained in each cell data.

As described above, from the cell sprite data, it is possible to generate a still image within a frame, as shown in FIG. 5. Therefore, in order to generate a 2D animation, motion data for changing the cell sprite at a prescribed frame is required.

Figure 7:
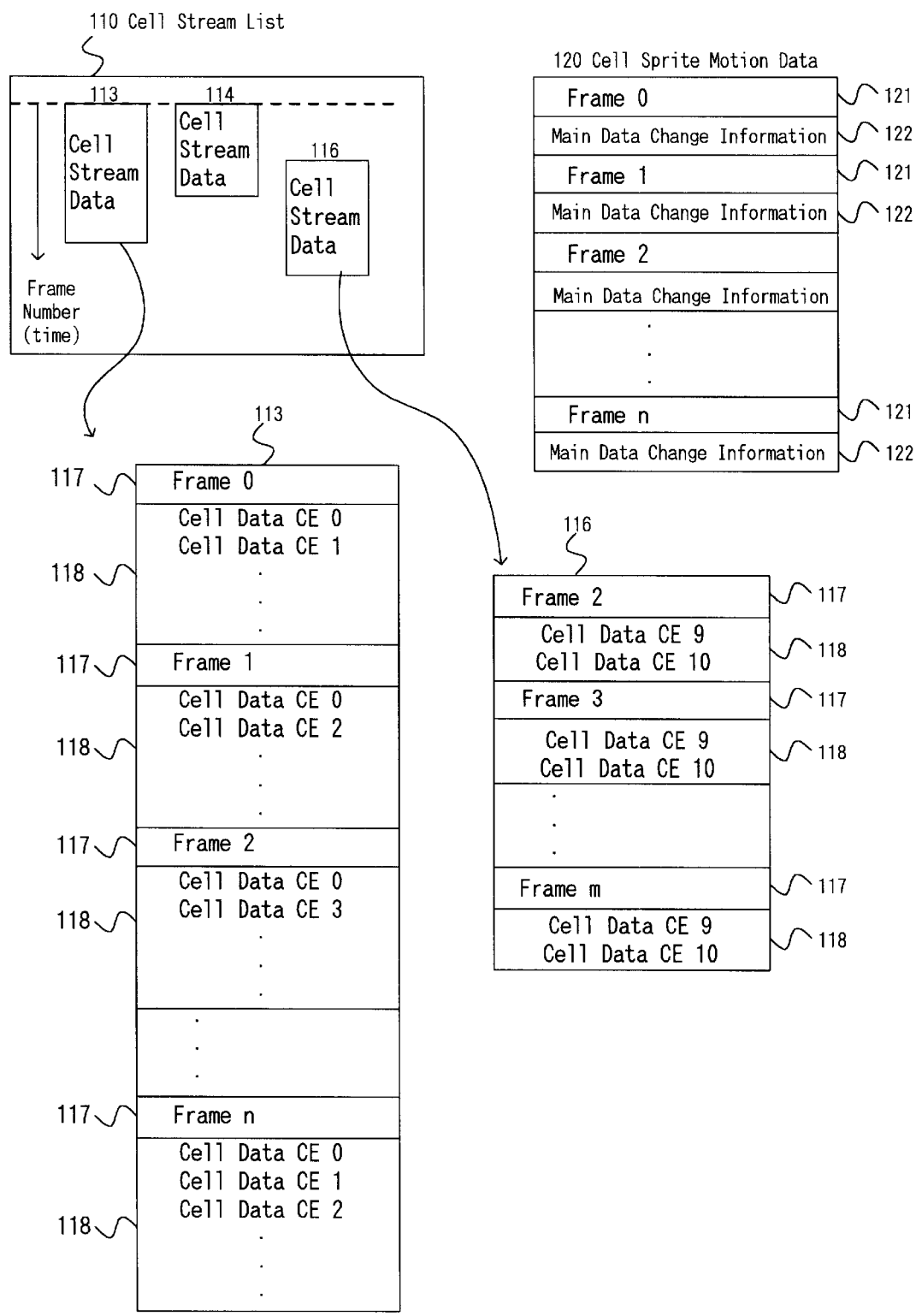
FIG. 7 is a structural diagram of motion data.

FIG. 7 is a diagram showing the structure of motion data contained in 2D animation data. This motion data consists of a cell stream list 110 for generating cell animations, and cell sprite motion data 120 for generating cell sprite animations. The cell stream list 110 comprises cell stream data 113, 114, 116 containing information relating to changes of a single cell or a plurality of cells. Moreover, the cell stream list 110 comprises a plurality of cell stream data. Each cell stream data comprises cell data change information corresponding to a series of frames. In other words, it contains information indicating how the cell data is to be changed at frame number M.

Therefore, the cell stream data 113, 116, and the like, is constituted, as shown in FIG. 7, for example, by a time stamp 117 having a frame number, and animation data 118 containing information indicating how specified cell data is to change at that frame. Moreover, a plurality of cell stream data are contained in the cell stream list 110, and the start frame, end frame and frame length relating to these respective cell stream data are each set in an independent fashion. Moreover, in some cases, the cell stream data is set in such a manner that it is repeated a certain number of times during the period of a prescribed number of frames. In the example shown in FIG. 7, the cell stream data 116 contains change information for the cells constituting the cell sprite, from frame 2 to frame m. Moreover, the cell stream data 113 also contains change information for a single cell or a plurality of cells which are drawn between frame 0 and frame n. The cell stream data 114 contains change information for a cell which is drawn for a further smaller number of frames.

The cell sprite motion data 120 contains information on changes in the cell sprite, and more specifically, it contains change information relating to the main data for the cell sprite corresponding to a series of frames. In the example in FIG. 7, it contains a frame number 121 and change information 122 for the main data corresponding to that frame number.

The cell data that is to be changed at each frame and the change information relating to the main data can be recognized from the motion data illustrated in FIG. 7. Therefore, by changing the cell sprite data in accordance with this change information, it is possible to create a still image for each frame, and by displaying still images of a series of frames in a consecutive fashion, an animation can be displayed.

In other words, the cell sprite data specifying the still image in a default state can be changed to a prescribed state at each frame, by means of the aforementioned motion data. More specifically, it is possible to define the position, size, colour, and the like, of a plurality of cells at local co-ordinates within a cell sprite, for each frame, by means of the cell stream list. Moreover, by means of the cell sprite motion data, it is possible to define the position, size, colour, and the like, of the cell sprite within the global co-ordinates system of the frame, for each frame. Consequently, by creating cell sprite data and motion data of this kind, a designer becomes able to design animations of characters and objects in a scene in a game, independently of a game programmer.

Moreover, although not illustrated, the cell stream data also contains a command indicating a program event. By locating this program event at a desired frame, it is possible to output sound, music, or the like, in addition to the animation, starting from the prescribed frame number, and hence, in addition to designing animations, the designer is able to design events that are to be performed in synchronism with the animation. For example, it is possible to execute a voice event in synchronism with the timing at which a character starts to open and close its mouth, or to execute a background music event in synchronism with a prescribed action. It is beneficial if the designer is able to specify events that are to be synchronized with prescribed timings in the animation, in addition to performing all aspects of the animation design process.

Figure 8:
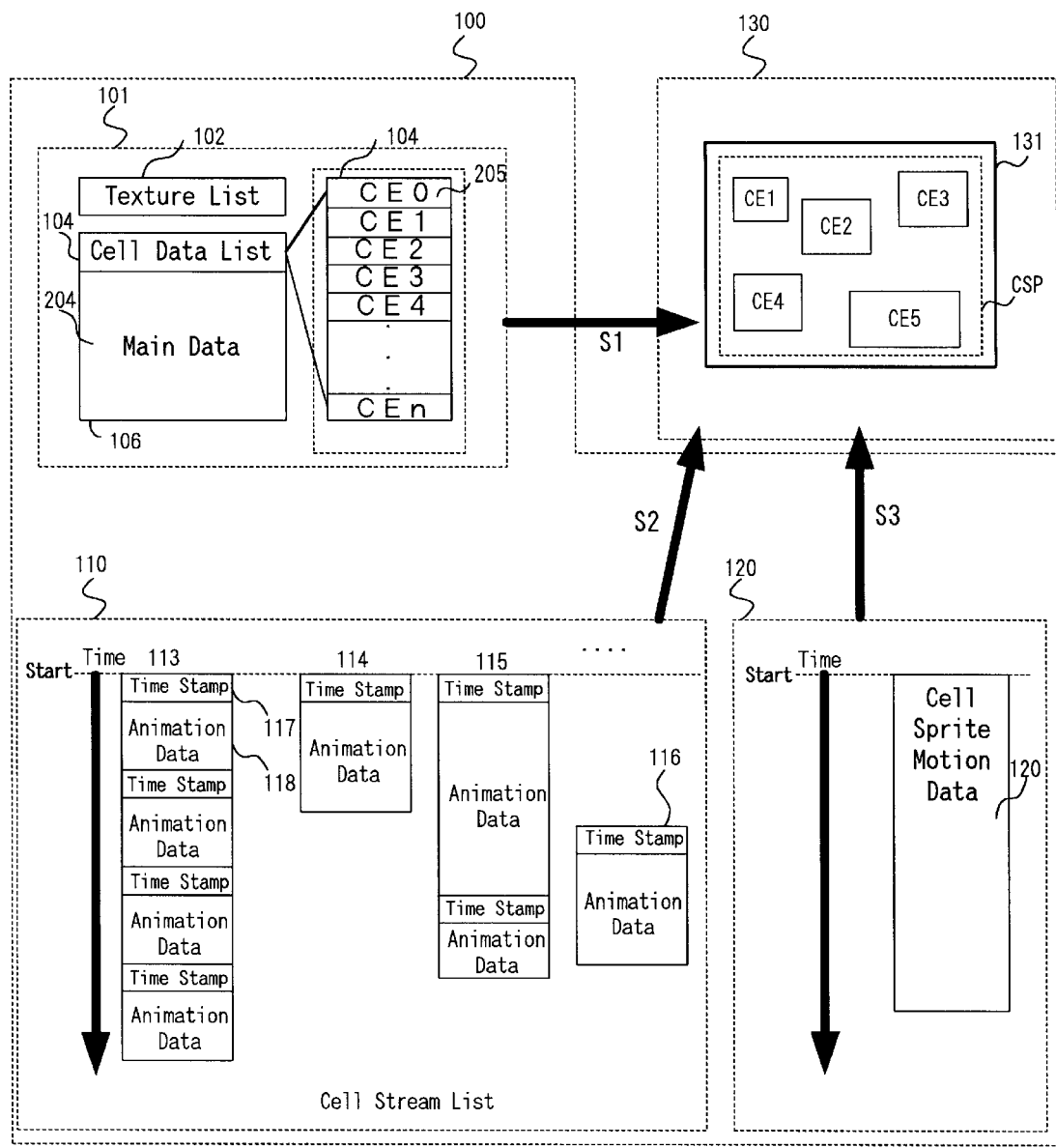
FIG. 8 is a diagram showing the relationship between a cell sprite stream data group forming 2D animation data, and a work buffer.

FIG. 8 is a diagram illustrating the relationship between a cell sprite stream data group forming 2D animation data and a work buffer. The cell sprite stream data group 100 forming the 2D animation data consists of a cell sprite data group 101 comprising a texture list 102 and cell sprite data 106, and motion data comprising a cell stream data list 110 and cell sprite motion data 120. As described in the foregoing, still images in a frame can be generated by means of the cell sprite data group 101, and the aforementioned cell sprite data 106 can be changed for each frame by means of the motion data 110, 120, thereby making it possible to generate an animation by means of a series of frames.

FIG. 8 illustrates steps S1, S2, S3 for generating an animation. In order to generate an animation, the cell sprite data group 101 is temporarily copied (duplicated) to a work buffer 130 in the hardware (step S1). Consequently, as illustrated in FIG. 8, it is possible, logically, to draw a cell sprite CSP consisting of a plurality of cells CE1–CE5 positioned within the frame 131 corresponding to the screen, into the work buffer 130.

Thereupon, by rewriting the cell sprite data in the work buffer in accordance with the frames, on the basis of the cell stream list 110, it is possible to generate a still image for a plurality of cells for each frame of the animation (S2). Furthermore, by rewriting the main data in the work buffer in accordance with the frames, on the basis of the cell sprite motion data 120, it is possible to specify the position of the cell sprite in each frame of the animation (S3). These three steps S1, S2, S3 are implemented by the drawing library 14. The image processing performed by the drawing library is described hereinafter.

Figure 9:
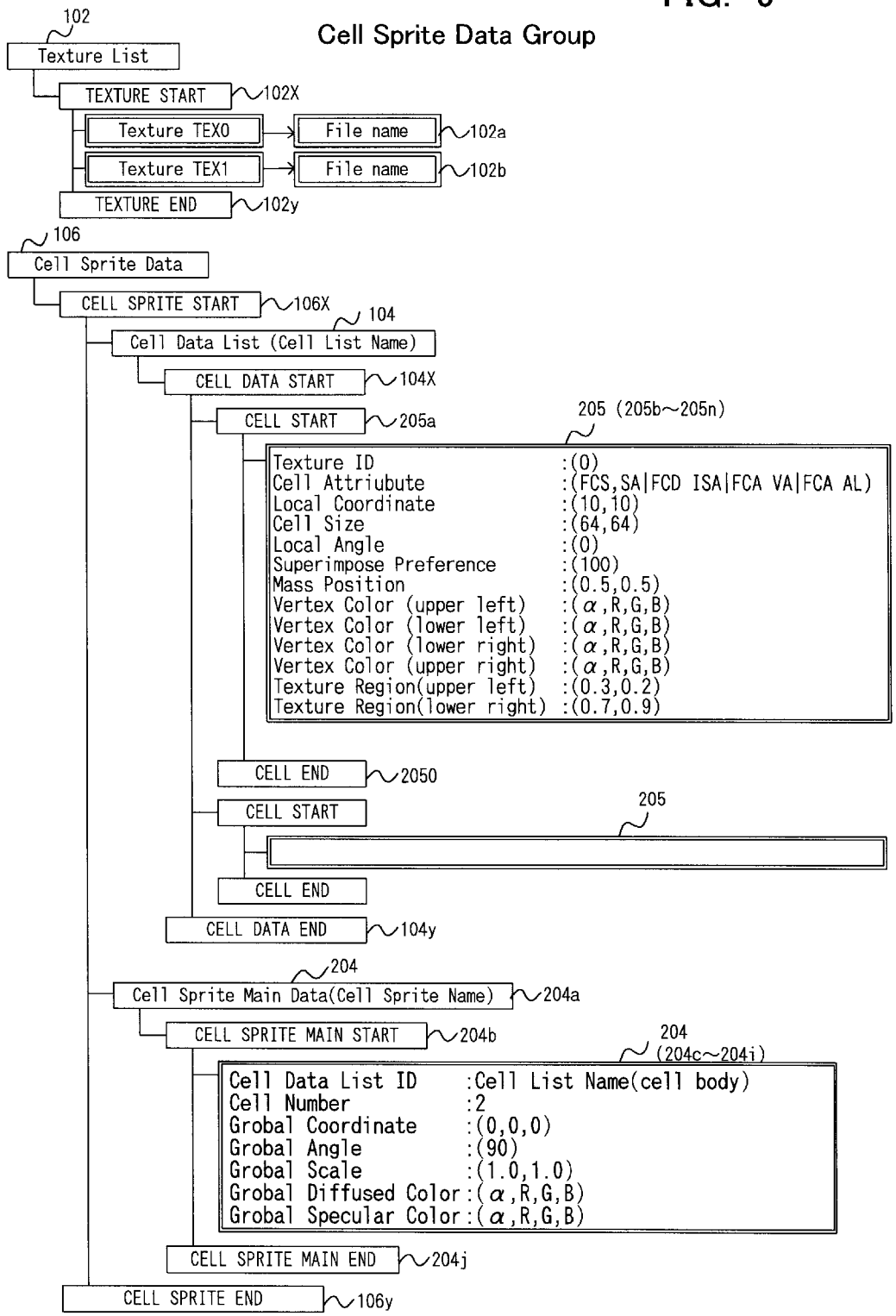
FIG. 9 is a diagram showing a compositional example of a cell sprite data group.
Figure 10:
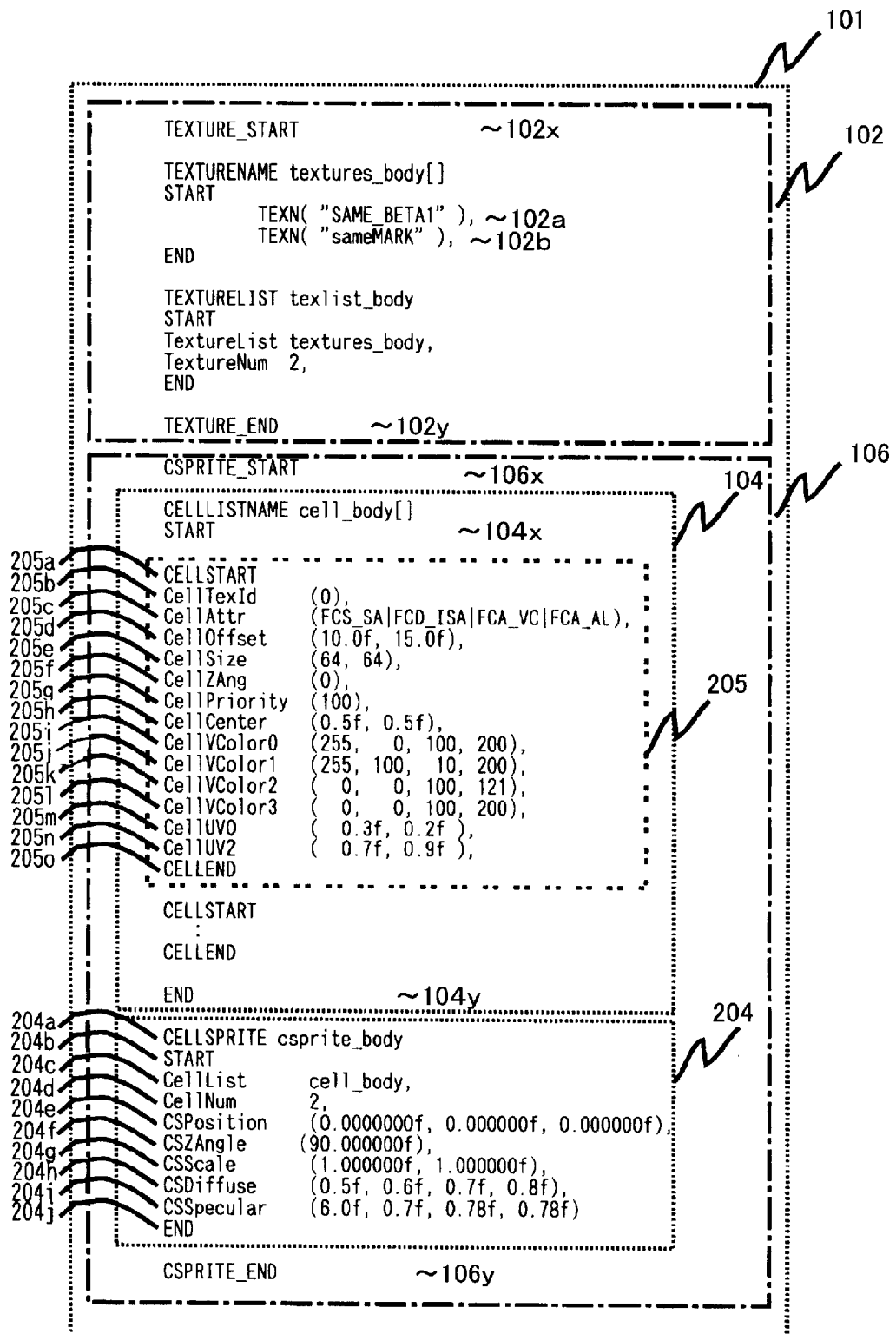
FIG. 10 is a diagram showing a specific example of a cell sprite data group.

FIG. 9 is a diagram illustrating an example of the composition of a cell sprite data group. FIG. 10 is a diagram illustrating a specific example of a cell sprite data group. Since the data group in the specific example in FIG. 10 is written in C computer language and is difficult to comprehend, FIG. 9 shows a more illustrative diagram of the composition in FIG. 10. Therefore, corresponding portions of the two diagrams have been labelled with the same reference numerals.

The cell sprite data group 101 comprises a texture list 102 and cell sprite data 106. The texture list 102 describes the texture lists 102a, 102b between the list start flag (TEXTURE START) 102x and the list end flag (TEXTURE END) 102y, in terms of the texture ID and file name. The texture IDs in these texture lists are quoted in the cell data 205. The file name is the name of the file in which the specific texture data is stored.

The cell sprite data 106 describes the cell data list 104 and the main data 204 between the data start flag 106x and the data end flag 106y. The cell data list 104 describes a plurality of cell data 205 between a data start flag 104x and a data end flag 104y. For example, the first cell data 205 describes the same attribute data as that illustrated in FIG. 6, between the cell data start flag (CELLSTART) 205a and end flag (CELLEND) 205j.

When describing the initial cell data 205, the cell data comprises: the texture Id to be used 205b; a cell attribute flag 205c; an offset value from origin of cell sprite, in other words, the local co-ordinates 205d of the cell; the cell size indicating the number of pixels in vertical and horizontal directions 205e; the angle of rotation of the cell corresponding to the local co-ordinates system within the cell sprite 205f; the priority order relating to superimposition of cells 205g; the centre of gravity of the cell 205h; colour data indicating transparency and RGB tonal values for the four vertices of the cell 205i–205k; and the top left and bottom right co-ordinate values for texture data to be attached to the cell 205m, 205n. In cases where a portion of the texture data in the file corresponding to the texture ID is to be attached to the cell, the texture data attached to the cell comprises data indicating the region to which texture is to be attached.

Next, the main data 204 for the cell sprite comprises: a cell sprite name definition 204a; a data start flag (START) 204b; a cell data list name 204c; a data number in the cell data list 204d; global co-ordinates 204e indicating the global position of the cell sprite; an angle of rotation corresponding to the global co-ordinates system of the cell sprite 204f; a global scale for the cell sprite 204g; a diffused colour 204h; a specular colour 204i; and a data end flag 204j.

As can be seen from the cell sprite data group described in the foregoing, when the cell sprite data group is given, it is possible to draw a cell sprite constituted by a plurality of cells in the frame. Therefore, by creating a cell sprite data group, a designer is able to create a still image in a prescribed frame, independently of a game programmer.

By using a prescribed design tool, the aforementioned cell sprite data group can be generated as illustrated in FIG. 10, simply by performing the action of attaching a cell image to a screen, for example.

Figure 11:
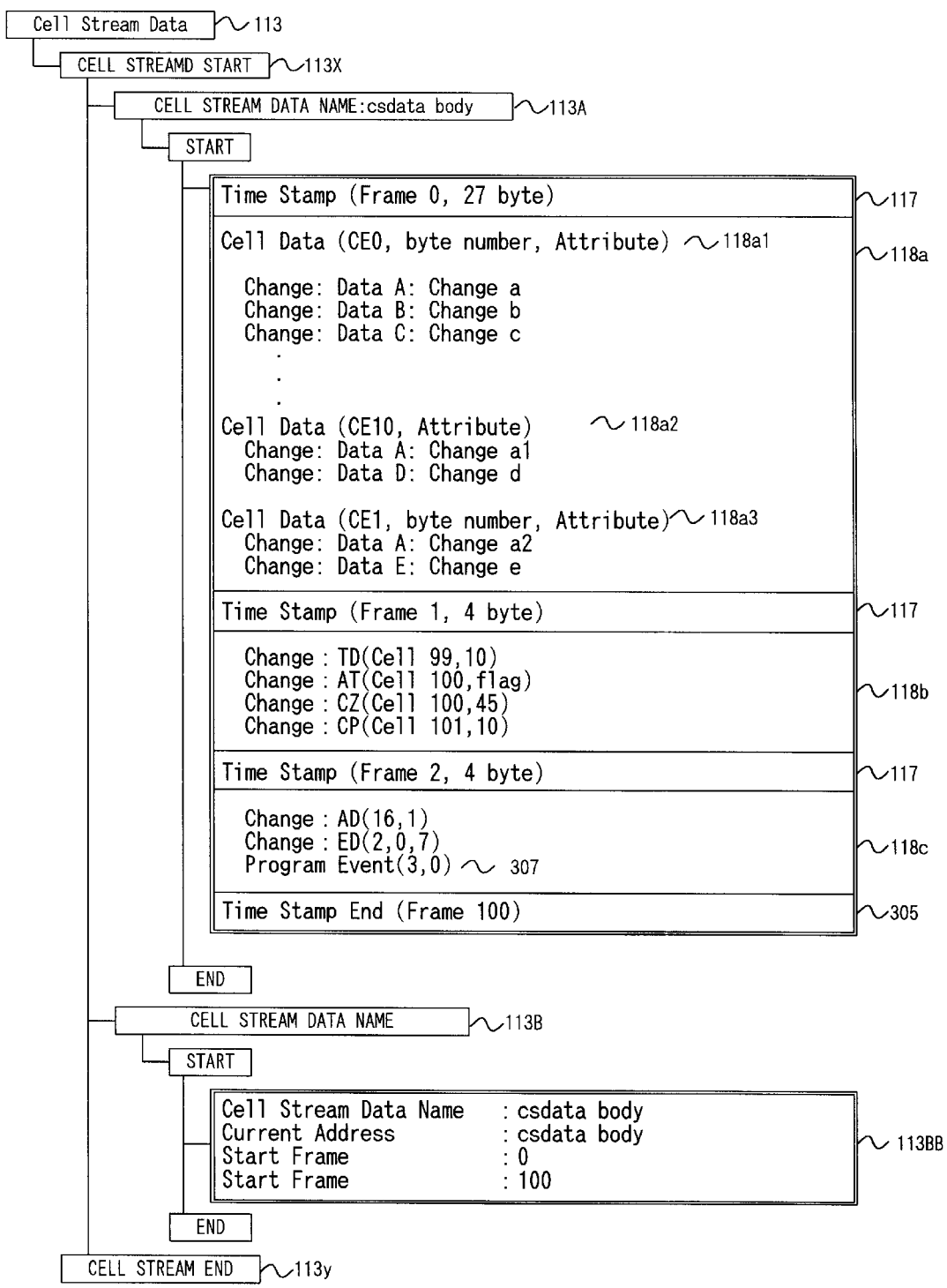
FIG. 11 is a diagram showing a compositional example of cell stream data.

FIG. 11 is a diagram illustrating an example of the composition of cell stream data. Furthermore, FIG. 12 is a diagram showing a specific example of the cell stream data. FIG. 12 is also described in C computer language, so the corresponding structure is illustrated more descriptively in FIG. 11.

In the examples shown in FIGS. 11 and 12, the cell stream data 113 describes the cell stream data 113A and the cell stream data 113B, between a cell stream start flag 113x and end flag 113y. Unlike FIG. 7, only the change (differential) data 118 for the cell data is described, following a time stamp 117 which indicates the frame number at which the change is to be made.

For example, as illustrated in FIGS. 11 and 12, at the time stamp (CCnk TS) 117 for frame 0, 27 bytes of differential data 118a are provided. This differential data 118a describes an attribute change (Bk IAO), priority change (Bk M01PR2), centre of gravity change (Bk CE3), vertex colour change (Bk VC4), and texture region change (Bk UV5), relating to the cell data CE=0 indicator flag (CCnk CE) 118a1. Moreover, the differential data 118a also describes change data relating to the cell data, following a cell data CE=10 indicator flag 118a2, and finally, it describes change data relating to the cell data, following a cell data CE=1 indicator flag 118a3.

Thereupon, at the time stamp (CCnk TS) 117 for frame 1, change data relating to a number of cell data is described, and at the time stamp (CCnk TS) 117 for frame 2, change data relating to cell data is described, and a flag 307 indicating a program event is also described. Consequently, it is instructed that event ID0 (eventId=0) indicated by the program flag 307 is to be executed at the timing of frame 2. Thereafter, there is no change to the cell data, and the time stamp end flag (CChn TE(100)) 305 shown at frame 100 indicates that the cell stream has ended.

The cell stream main data 113B contains, respectively, a cell stream data name, a current address, a start frame number and an end frame number.

The aforementioned cell stream data 113 is interpreted by the drawing library, described below, and the cell sprite data stored in the work buffer is rewritten in accordance with the cell data change data. In other words, each time the frame advances, the drawing library checks in the cell stream data to see whether or not there is any change in the cell data, and it then changes the cell data accordingly, at the frame that matches the frame number of the time stamp.

The cell stream data illustrated in FIG. 11 and FIG. 12 uses a time stamp flag indicating the frame number, and it describes only the cell data that needs to be changed at that frame, from the cell data for the preceding frame. Consequently, it is possible to reduce, effectively, the volume of the cell stream data. However, if it is not necessary to reduce the data volume in this manner, then change data relating to the default values of the cell data can be described for each frame, as illustrated in FIG. 7.

Figure 13:
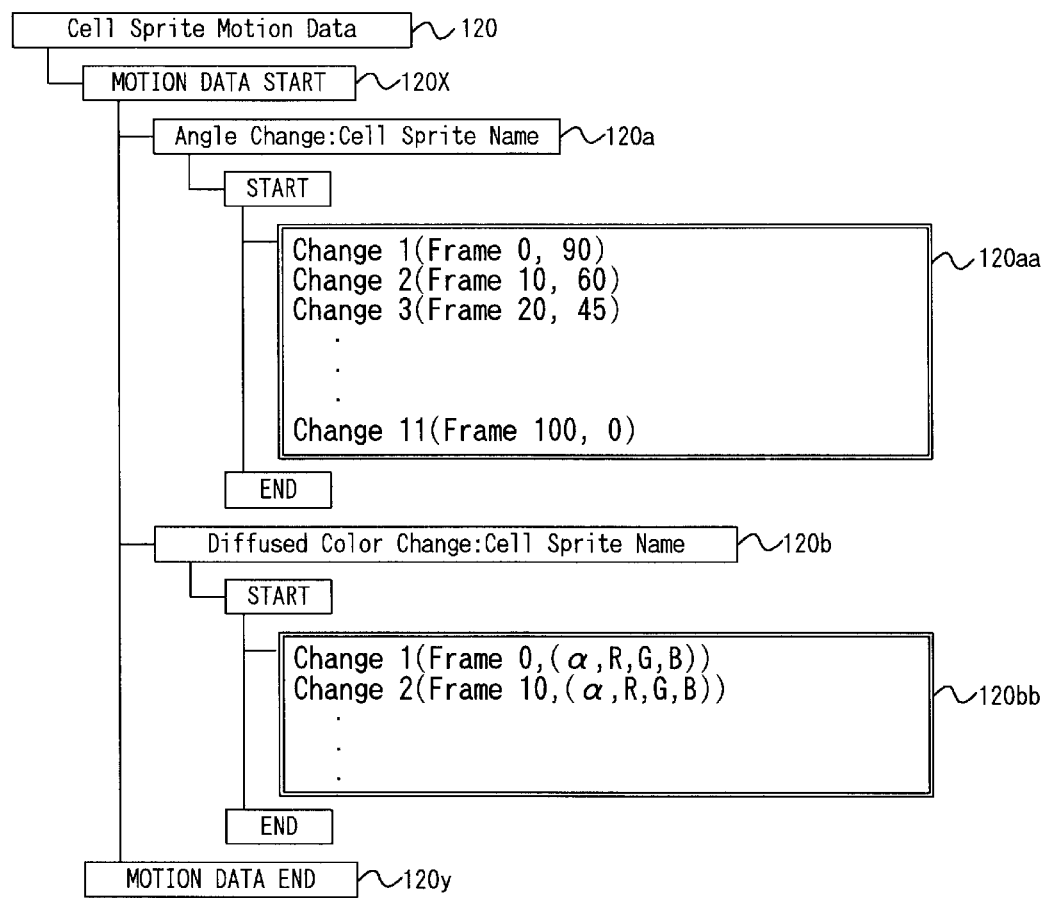
FIG. 13 is a diagram showing a compositional example of cell sprite motion data.
Figure 14:
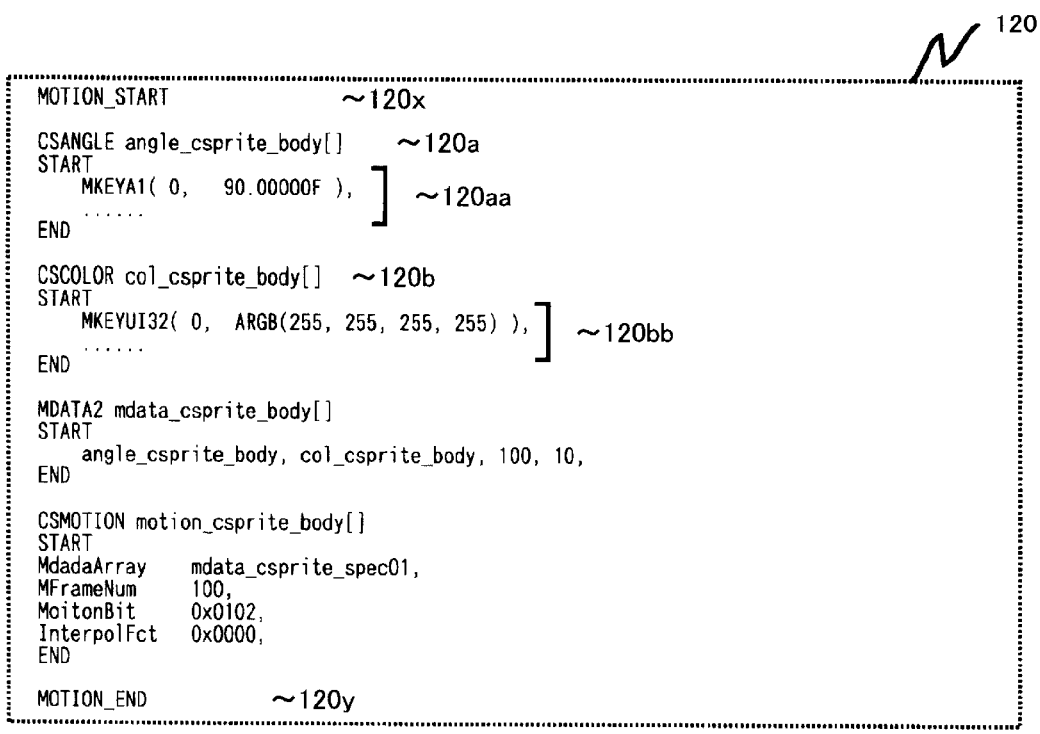
FIG. 14 is a diagram showing a specific example of cell sprite motion data.

FIG. 13 is a diagram for illustrating an example of the composition of cell sprite motion data. Furthermore, FIG. 14 is a diagram illustrating a specific example of cell sprite motion data corresponding to same. In the examples in FIG. 13 and FIG. 14, the data corresponding to the frame is described as main data for the cell sprite data. Change data for this data is only supplied at intermittent frames, for instance, frame 0, 10, 20, . . . , 100. Moreover, the data for the frames between these intermittent frames is determined by interpolation from the data in the adjacent frames. By adopting this approach, it is possible greatly to reduce the data volume.

In the examples in FIG. 13 and FIG. 14, a change flag 120a for global angle and corresponding change data 120aa, and a change flag 120b for diffused colour and corresponding change data 120bb, are described between a motion data start flag 120x and a motion data end flag 120y. Therefore, on the basis of this motion data, it is possible to generate an animation where in the cell sprite moves within the frame, whilst the global angle changes from frame 0 to frame 100, and whilst the diffused colour also changes.

As described in the foregoing, the cell sprite data 106 is rewritten in the work buffer each time the frame changes, when necessary, according to the motion data 120 corresponding to the main data forming the cell sprite global data, and the animation data 113 corresponding to the cell data, and the like.

FIG. 15 is a diagram illustrating an example of a program event. The drawing library is able to draw an animation from the cell sprite stream data group 100. Thereupon, it is necessary to execute a prescribed event in synchronism with a desired timing in the animation. For this purpose, in the present embodiment, a program event command is inserted in the cell stream data. When this program event is called up, the event illustrated in FIG. 15 is implemented. The event ID0 is called up by the command eventID:0, and it is executed according to three arguments relating to the words, the loudness of the voice and the pitch of the voice. Accordingly, in the cell stream data, argument data is also specified, along with the event ID.

Figure 17:
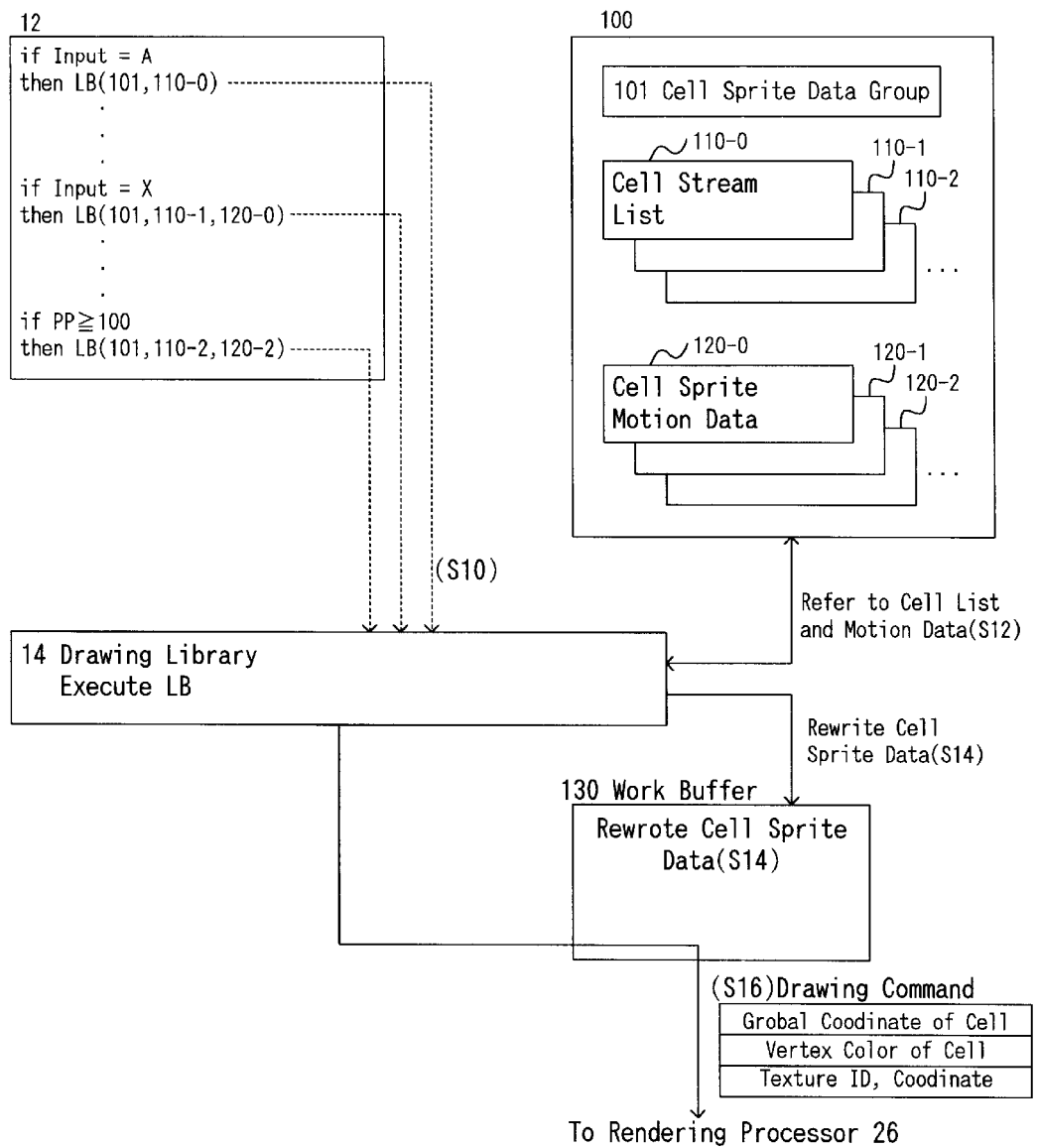
FIG. 17 is a diagram showing a relationship between software and 2D animation data.
Figure 18:
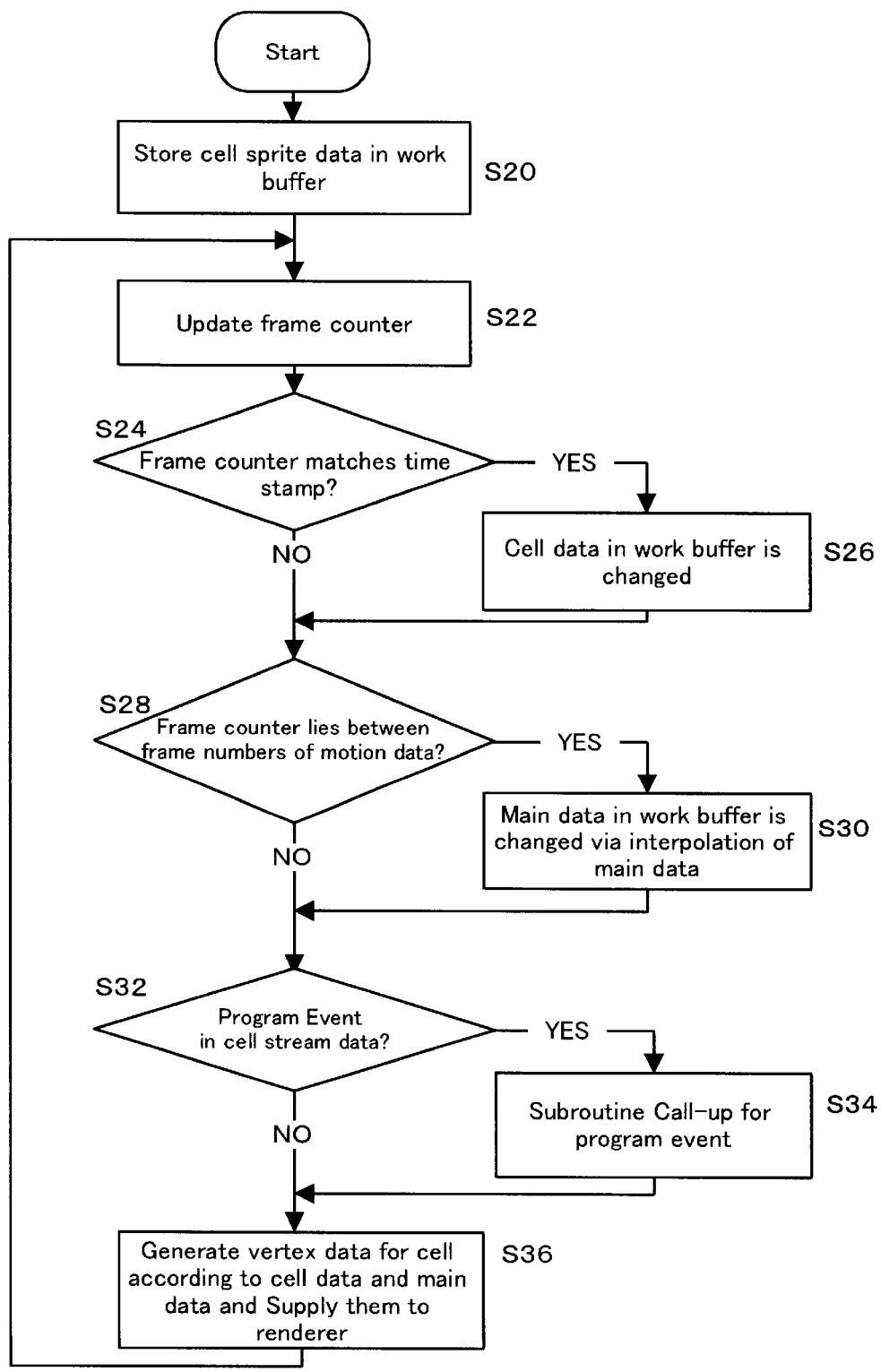
FIG. 18 is a drawing process flowchart as implemented by a drawing library.

FIG. 16 is a diagram illustrating the relationship between a cell sprite data stream group and a library function. FIG. 17 is a diagram illustrating the relationship between software and 2D animation data. Moreover, FIG. 18 is a drawing process flowchart as implemented by the drawing library. The drawing process implemented by the drawing library is now described with reference to these drawings.

The cell sprite stream data group 100 illustrated in FIG. 16 comprises a cell sprite data group 101, a plurality of cell stream lists 110, and a plurality of cell sprite motion data 120. The cell stream lists 110 are, for example, data for generating animation of the face of the character, and may include, for instance, a cell stream list 110-0 corresponding to a cell animation of the character talking, a cell stream list 110-1 corresponding to a cell animation of the character laughing, a cell stream list 110-2 corresponding to a cell animation of the character showing surprise, and the like. In this case, for example, when the character talks, laughs or shows surprise, then provided that the animation of the cells relating to the body trunk of the character all remain the same, the same body trunk cell stream list will be used commonly for each of the respective cell stream lists 110-0, 110-1, 110-2. This efficient use of the cell stream lists can be achieved by constituting a cell sprite by means of a plurality of cells, and supplying cell stream data corresponding to a desired single cell or plurality of cells, to the cell stream list 110, in an independent fashion.

Moreover, cell sprite motion data 120 indicating global movement of the cell sprite comprises, for example, motion data 120-0 for moving the cell sprite in a sideways direction, motion data 120-1 for removing the cell sprite outside the screen, motion data 120-2 for rotating the cell sprite, and the like.

As illustrated in FIG. 16, the designer prepares several types of cell stream lists 110 and cell sprite motion data 120, corresponding to different types of animations. In this case, since the cell stream lists 110 are constituted by a combination of cell stream data, it is possible to efficiently create cell stream lists by standardizing the cell stream data.

Following the command 'LB', for example, the library function (drawing function) specifies a selected cell stream list number and cell sprite motion data number as arguments with respect to the cell sprite stream data group illustrated in FIG. 16. As shown in the lower column in FIG. 16, if the library function is LB (101, 110-0), then an animation corresponding to the cell stream list 110-0 will be generated for the cell sprite data group 101. In this case, since there is no change in the main data for the cell sprite, there is no movement in the position of the cell sprite as a whole. Moreover, in the case of a further library function LB (101, 110-1, 120-0), an animation corresponding to the cell stream list 110-1 and the cell sprite motion data 120-0 is generated for the cell sprite data group 101.

As shown in FIG. 17, three drawing library functions are called up by the game program 12 in response to an input code from the operator. The respective library functions LB are executed by the drawing library 14 (S10). The drawing library refers to the cell stream list and motion data specified by the library function (S12), and then rewrites the cell sprite data in the work buffer 130 for each frame (S14). Thereupon, the drawing library 14 generates a drawing command which can be transferred to the rendering processor 26, from the cell sprite data rewritten in the work buffer (S16). As illustrated in FIG. 17, the drawing command comprises, for example, global co-ordinates for the cell, vertex colours for the cell, texture ID and texture co-ordinates to be used, and the like.

The 2D cells are treated similarly to normal polygons by the rendering processor 26, and rendered accordingly. In other words, in the case of a 3D animation, the vertex data of the plurality of polygons is subjected to perspective processing, converted to a 2D co-ordinates system, and then supplied to a rendering processor 26 in the form of drawing commands. Therefore, the rendering process performed by the rendering processor is virtually the same in the case of 3D animation as in the case of 2D animation, and hence there is no need to distinguish therebetween.

The drawing process is now described in accordance with the drawing process flowchart for the drawing library shown in FIG. 18. The drawing library is a program, which generates drawing commands containing data relating to the global co-ordinates (co-ordinates within the display screen), colour, texture, and the like, of the cells in the frame forming the display screen, on the basis of the cell sprite stream data group designated by the library function. In other words, the drawing library having a similar function to a geometry processor in general image processing.

As illustrated in FIG. 18, when a drawing command is output by means of the library function, the drawing library stores the cell sprite data in the work buffer (S20). The frame counter is then updated (S22), and cell sprite data in the corresponding frame is generated in the work buffer, by referring to the cell stream list and cell sprite motion data specified by the library function.

In other words, if the frame counter value matches the frame value of the time stamp in the cell stream data (S24), then the cell data in the work buffer is changed in accordance with the change data under that cell stamp (S26). Since a plurality of cell stream data are present in parallel in the cell stream list, it is necessary to compare the current frame number with the time stamp frame value, for all of the cell stream data.

Moreover, if the frame counter value lies between two of the intermittent frame numbers for the motion data (S28), then the main data in the work buffer is changed by deriving the main data for the current frame by interpolation from the main data for the two frame numbers (S30). Thereupon, if there is a program event in the cell stream data (S32), then a subroutine call-up for that program event is supplied to the program (S34).

In this way, the cell sprite data group for the current frame is stored in the work buffer, and global co-ordinates, colour data, texture ID and texture co-ordinates are generated as cell vertex data according to the corresponding cell data and main data (S36). Drawing commands are supplied to the rendering processor 26 in the hardware 20, along with the data generated in this way. At the rendering processor 26, rendering is carried out in accordance with the supplied cell vertex data, and image data for each pixel is stored in the frame memory 28. An animation is displayed on the display device 34 in accordance with this image data.

In the foregoing embodiment, the description related to 2D animation data for performing a 2D animation. However, by setting the angle data in terms of angles about the X, Y, Z axes of a three-dimensional co-ordinates system, rather than simply an angle about the Z axis, in the cell data 205, it is possible to cause the cells (sprite) to be rotated to any angle about the X, Y, Z axes. Consequently, rather than attaching cells (sprite) consisting simply of two-dimensional images to a frame, it is possible to cause cells to rotate within a three-dimensional space, similarly to a polygon, when attaching them to a frame forming the display screen. In this sense, the present invention can be applied not only to 2D animations, but also to animations wherein cells are located within a three-dimensional space.

As the foregoing description will have revealed, in the aforementioned embodiment, it is possible for a designer to create animation data for a cell sprite, wherein the mutual relationships between a plurality of cells are specified, independently from a game programmer. Moreover, since the 2D animation data created by the designer comprises still images consisting of a plurality of cells and motion data (cell stream list and cell sprite motion data) for causing these to move, this alone provides a data form at which enables the final display to be achieved. Consequently, the designer is cable to create a desired animation by means of 2D animation data (cell sprite stream data group).

Moreover, since the cell stream list in the motion data can specify the animation in units of single cells or a plurality of cells, it is possible to create a large number of animations by combining these units, using a small amount of data, and hence animation design efficiency can be improved, whilst the volume of data involved can be reduced. Furthermore, since the motion data is constituted by differential information for the current frame with respect to the preceding frame, it is possible to reduce the data volume in this respect also.

Furthermore, since a command calling up a program event can be stored in the cell stream data, it is possible to execute a desired event in synchronism with a desired timing in the animation. Therefore, the designer is able freely to combine the animation with spoken words, background music, or the like, at a desired timing.

The main data comprising global data for the cell sprite consisting of a plurality of cells can also be changed for each frame by means of the motion data, and therefore it is possible to control the position of the whole cell sprite, in a simple manner, in scenes where the character is moving, explosion scenes, or the like, comprising a large plurality of cells, for example. Consequently, it is possible to generate high-quality animations which closely match the intentions of the designer.

By means of the present invention, in animation for a game, a designer is able to design animations independently of a game programmer, and hence the efficiency of game development is increased, and animations of higher quality can be generated.

The scope of the present invention is not limited by the embodiment described above, and it also extends to the inventions described in the attached claims and equivalents thereof.

What is claimed is:

1. A storage medium storing:
    an animation data having,
        cell sprite data including a plurality of cell data each of which contains, at the least, position data and texture data for said cell, and
        motion data including cell stream data each of which contains change information of said cell data in accordance with a series of frames;
    a game program for implementing a game in response to operational inputs from an operator and for designating said motion data in said animation data; and
    a drawing program for generating cell sprite data for the frame currently under processing by changing said cell sprite data on the basis of said motion data designated by said game program, and for generating rendering data containing position data for the cells in said frame from the aforementioned generated cell sprite data,
    wherein said animation data, game program, and drawing program are separately constituted in the storage medium.

2. The storage medium storing animation data according to claim 1, wherein a cell sprite is constituted by said plurality of cells; and
    said cell sprite data further comprises main data containing global positioning information for said cell sprite within said frame.

3. The storage medium storing animation data according to claim 2, wherein said motion data also comprises cell sprite motion data containing change information for said main data in accordance with a series of frames.

4. The storage medium storing animation data according to claim 3, wherein said cell sprite motion data contains differential information for said main data in the current frame, with respect to said main data in the preceding frame, for each group of a prescribed number of frames.

5. The storage medium storing animation data according to claim 1, wherein said motion data comprises a cell stream list wherein a plurality of said cell stream data are correlated via frame numbers.

6. The storage medium storing animation data according to claim 5, wherein a prescribed cell stream data of said plurality of cell stream data contained in said cell stream list has a different start frame and/or end frame.

7. The storage medium storing animation data according to claim 5, wherein a prescribed cell stream data of said plurality of cell stream data contained in said cell stream list has a loop composition which is repeated at each cycle of a prescribed number of frames.

8. The storage medium storing animation data according to claim 1, wherein said cell stream data contains differential information for said cell data in the current frame, with respect to said cell data in the preceding frame, in accordance with a prescribed frame number.

9. The storage medium storing animation data according to claim 1, wherein said cell stream data contains event commands instructing execution of a prescribed program event, in accordance with a prescribed frame number.

10. An image processing system comprising:
    the storage medium according to claim 1; and
    rendering unit for generating image data for pixels for each frame, in accordance with said rendering data.

11. An imaging processing method for generating rendering data for each frame, by referring to the animation data having cell sprite data including a plurality of cell data, each of which contains at least position data and texture data for said cell, and motion data including cell stream data, each of which contains change information for said cell data in accordance with a series of frames, comprising the steps of:
    generating cell sprite data for the frame currently under processing by changing cell sprite data on a basis of designated motion data;

generating position data for each cell in said frame, in accordance with the cell sprite data for said frame currently under processing; and rendering to generate image data for pixels for each frame, in accordance with rendering data including said position data for each cell within the frame, and texture data for each cell, wherein said cell stream data contains differential information for said cell data between a critical frame and a preceding frame in accordance with a frame number of the critical frame, and in said step of generating cell sprite data, the cell sprite data for the currently processing frame is generated based on the differential information for said cell data from the cell sprite data in the preceding fame, when the currently processing frame matches to the frame number.

12. A storage medium storing an image processing program for causing a computer to execute a procedure for generating rendering data for each frame, by referring to animation data having cell sprite data including a plurality of cell data each of which contains at least position data and texture data for said cell, and motion data including cell stream data each of which contains change information for said cell data in accordance with a series of frames on the basis of said motion data designated by a game program which implements a game in response to operational inputs from an operation, the procedure comprising the steps of:

generating cell sprite data for the frame currently under processing by changing cell sprite data on a basis of designated motion data; and generating position data for each cell in said frame, in accordance with the cell sprite data thus gathered, wherein said image processing program is constituted separately from said animation data and said game program.

13. A storage medium storing an image processing program for causing a computer to execute a procedure for generating rendering data for each frame of a series of frames, by referring to cell sprite stream data, on the basis of said motion data designated by a game program which implements a game in response to operational inputs from an operation, the procedure comprising the steps of:

generating cell data and main data for the frame currently under processing by changing cell data on a basis of designated cell data, and changing main data on a basis of designated motion data; and generating position data for each cell within said frame in accordance with the cell data and main data thus generated for said frame currently under processing;

wherein said cell sprite stream data comprises,
 a plurality of cell data, each of which contains at least position data and texture data for said cell;
 a main data containing global positioning information for said cell sprite within said frame; and motion data comprises cell sprite motion data containing change information for said main data over said series of frames; and wherein said image processing program is constituted separately from said animation data and said game program.

14. A storage medium storing an image processing program for causing a computer to execute a procedure for generating rendering data for each frame, by referring to animation data having cell sprite data including a plurality of cell data, each of which contains at least position data and texture data for said cell, and motion data including cell stream data, each of which contains change information for said cell data in accordance with a series of frames, and a cell stream list, which correlates a plurality of said cell stream data via frame numbers, on the basis of said motion data designated by a game program which implements a game in response to operational inputs from an operation, the procedure comprising the steps of:

generating said plurality of cell data for the frame currently under processing by changing a plurality of cell data within a prescribed frame processing time period, on a basis of a designated cell stream list; and generating position data for each cell in said frame, in accordance with the cell data thus generated for each frame under processing, wherein said image processing program is constituted separately from said animation data and said game program.

15. A storage medium storing an image processing program for causing a computer to execute a procedure for generating rendering data for each frame, by referring to animation data having cell sprite data including a plurality of cell data, each of which contains at least position data and texture data for said cell, and motion data including cell stream data, each of which contains change information for said cell data in accordance with a series of frames, and event commands instructing execution of a prescribed program event, on the basis of said motion data designated by a game program which implements a game in response to operational inputs from an operation, in accordance with a prescribed frame number, the procedure comprising the steps of:

generating cell sprite data of the frame currently under processing, by changing cell sprite data on a basis of designated motion generating position data for each cell in said frame, in accordance with the cell sprite data thus generated for said frame under processing; and reading out a corresponding event in response to an event commanding said cell stream data, wherein said image processing program is constituted separately from said animation data and said game program.

* * * * *